United States Patent [19]

Liang et al.

[11] Patent Number: 5,598,075
[45] Date of Patent: Jan. 28, 1997

[54] SERVO CONTROL METHOD AND APPARATUS FOR DISCHARGING MACHINE

[75] Inventors: Jui-Fang Liang, Jang Hwa; Hsing-Jung Chuang, Taipei, both of Taiwan

[73] Assignee: Industrial Technology Research Institute, Hsinchu, Taiwan

[21] Appl. No.: 527,819

[22] Filed: Sep. 13, 1995

[51] Int. Cl.$^6$ ..................................... B23P 1/08
[52] U.S. Cl. ...................... 318/571; 318/570; 219/69.13; 219/69.16
[58] Field of Search .................... 318/560–579; 219/69.1–69.19

[56] References Cited

U.S. PATENT DOCUMENTS

| | | | |
|---|---|---|---|
| Re. 31,493 | 1/1984 | Pfau | 219/69.13 |
| 3,996,445 | 12/1976 | Wohlabaugh | 219/69.13 |
| 4,090,961 | 5/1978 | Rhyner et al. | 219/69.13 |
| 4,361,745 | 11/1982 | Rupert et al. | 219/69.16 |
| 4,370,537 | 1/1983 | Oizumi et al. | 219/69.2 |
| 4,387,285 | 6/1983 | Obara | 219/69.18 |
| 4,404,448 | 9/1983 | Bommeli | 219/69.16 |
| 4,504,722 | 3/1985 | Kishi et al. | 219/69.18 |
| 4,614,854 | 9/1986 | Obara et al. | 219/69.13 |
| 4,760,233 | 7/1988 | Obara | 219/69.16 |
| 4,777,339 | 10/1988 | Ho | 219/68.13 |
| 5,486,765 | 1/1996 | Izumiya et al. | 324/537 |

*Primary Examiner*—Paul Ip
*Attorney, Agent, or Firm*—W. Wayne Liauh

[57] ABSTRACT

Disclosed is a servo control method and apparatus for use on discharging machines to control the discharging conditions on working piece. In conventional art, feedrate control is based on the average of the discharging voltage between the discharging electrode and the working piece, which takes the off-time period into account; and in the condition of a long off-time period, the average voltage will be lowered as to affect the stability of the discharging process. The servo control method and apparatus according to the present invention disregards the off-time period and takes only the ignition voltage and discharging voltage into account such that the stability of the discharging machine will not be affected. Furthermore, during discharging, the servo control method and apparatus is capable of detecting whether there is a short-circuit condition and adjusting the average voltage accordingly so as to quickly remove the discharging electrode from the working piece.

3 Claims, 4 Drawing Sheets

SERVO CONTROL METHOD AND APPARATUS FOR DISCHARGING MACHINE

BACKGROUND OF THE INVENTION

1. Field of the Invention

The present invention relates to discharging machines, and more particularly, to a servo control method and apparatus for use on discharging machines to control the discharging of electric arc on a working piece.

2. Description of Prior Art

FIG. 1 shows a schematic block diagram of a conventional servo control system for discharging machine, in which the numeral 1 designates circuit representation of the discharging machine, and 2 designates a servo control circuit used to control the feedrate to the discharging machine. The servo control circuit is composed of a voltage divider 3, an averaging circuit 4, and a CNC circuit 5. The voltage divider 3 is used to sample a voltage signal from the voltage between the discharging electrode and the working piece and feed it to the averaging circuit 4 to be averaged there. The averaged signal is then sent to the CNC circuit 5 to be used to control the feedrate of the discharging machine. In this conventional method, the discharge signal has a waveform the same as the output signal 6 of the voltage divider 3, which is illustrated in FIG. 2. The average voltage is obtained in accordance with the following equation:

$$V_{g2}=(V_i*T_i+V_d*T_{on})/(T_i+T_{on}+T_{off})$$

wherein $V_{g2}$ is the average voltage,
$V_i$ is the ignition voltage,
$V_d$ is the discharging voltage,
$T_i$ is the ignition delay,
$T_{on}$ is the length of the duration the discharging is on, and
$T_{off}$ is the length of the duration the discharging is off.

It can be learned from the foregoing equation that when the average voltage of the discharge is related to the off-time $T_{off}$, i.e., a change in $T_{off}$ will change the average voltage and thereby affect, the stability of the machining process. Under this circumstance, other settings of the discharging machine must be adjusted in order to restore stability. Further drawbacks of this conventional method include a slow response of the discharge and accumulation of carbon when the machining is insufficient.

SUMMARY OF THE INVENTION

It is therefore a primary objective of the present invention to provide a discharging machine servo control method and apparatus that allows the average voltage to be always higher than a reference voltage so that the discharging process is always stable.

It is another objective of the present invention to provide discharging machine servo control method and apparatus capable of interrupting the discharging when short-circuit is being detected and the duration of the off-time is counted in the average voltage so as to retreat the discharging electrode quickly.

In accordance with the foregoing and other objectives of the present invention, there is provided with a novel discharging machine servo control method and apparatus. The servo control method comprises the following steps of: (1) detecting whether discharging condition is normal or arc, a short-circuit condition being judged when the count of arc discharging continuously exceeds a preset number of N; (2) detecting whether discharging process is in on-time period for a normal and an arc discharging or in off-time period for a short-circuit discharging; (3) if in on-time period, obtaining the value of average voltage in accordance with the following equation:

$$V_{g1}=(V_i*T_i+V_d*T_{on})/(T_i+T_{on})$$

wherein $V_{g1}$ represents average voltage,
$V_i$ represents ignition voltage,
$V_d$ represents discharging voltage,
$T_i$ represents ignition delay, and
$T_{on}$ represents length of the duration the discharging is on;

(4) if not in off-time period, obtaining the value of average voltage by using sample-and-hold method; (5) if short-circuit condition is being judged, interrupting the discharging process for an off-time period and obtaining the value of average voltage in accordance with the following equation:

$$V_{g2}=(V_i*T_i+V_d*T_{on})/(T_i+T_{on}+T_{off})$$

wherein $V_{g2}$ represents average voltage,
$V_i$ represents ignition voltage,
$V_d$ represents discharging voltage,
$T_i$ represents ignition delay,
$T_{on}$ represents length of the duration the discharging is on, and
$T_{off}$ represents length of the duration the discharging is off;

and (6) using numeral control method based on the obtained value of average voltage $V_{g1}$ to control the discharging machine feedrate, or to retreat quickly as obtained average voltage $V_{g2}$.

The servo control apparatus performing the foregoing method comprises: (a) a voltage divider for obtaining a voltage signal from the discharging voltage between the discharging electrode and the working piece; (b) a discharge detection circuit for detecting whether the discharging voltage is normal or abnormal; (c) a short-circuit detection circuit, coupled to said discharge detection circuit, for detecting whether the discharging voltage is in short-circuit condition based on the criterion that the count of arc discharging continuously exceeds a preset number of N; (d) a sequential processing circuit for generating timing control binary signal based on input from said short-circuit detection circuit; (e) a sample-and-hold circuit, coupled to said voltage divider and said sequential processing circuit, for processing the output of said voltage divider by using sample-and-hold method based on the timing control binary signal; and (f) an averaging circuit, coupled to said sample-and-hold circuit, for averaging the output of said sample-and-hold circuit; and (g) a CNC circuit, responding to the output of the averaging circuit, for controlling the action of the discharging electrode of the discharging machine.

BRIEF DESCRIPTION OF DRAWINGS

The present invention can be more fully understood by reading the subsequent detailed description of the preferred embodiments thereof with references made to the accompanying drawings, wherein.

DETAILED DESCRIPTION OF PREFERRED EMBODIMENT

Figure 1:
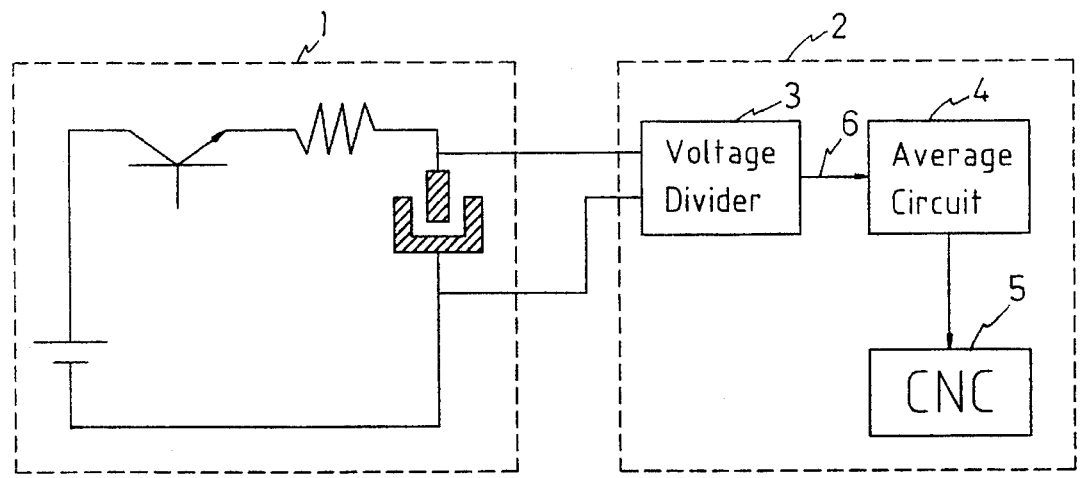
FIG. 1 is a schematic block diagram, showing a conventional servo control apparatus for discharging machine.
Figure 2:
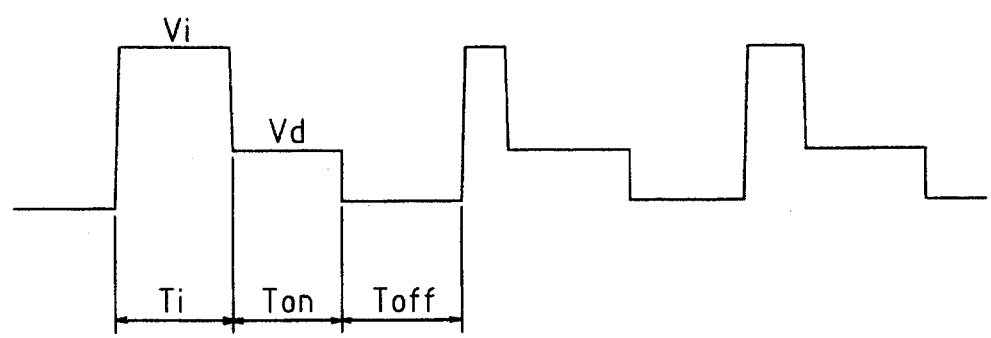
FIG. 2 is a waveform diagram, showing an output signal generated by a voltage divider in the conventional discharging machine of FIG. 1.
Figure 3:
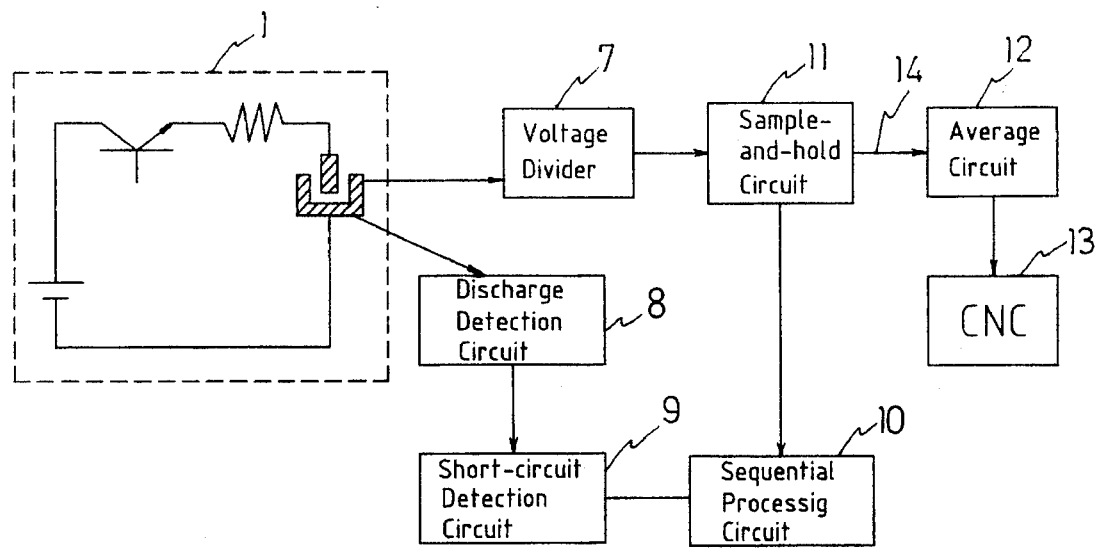
FIG. 3 is a schematic block diagram, showing a servo control apparatus according to the first preferred embodiment of the present invention.

FIG. 3 shows a schematic block diagram of a servo control apparatus according to the present, invention, which is composed of a voltage divider 7, a discharge detection circuit 8, a short-circuit detection circuit 9, a sequential processing circuit 10, a sample-and-hold circuit 11, an averaging circuit 12, and a CNC circuit 13. The discharge detection circuit 8 is used to monitor the voltage $V_i$ between the discharging electrode and the working piece to detect whether the discharging is normal or abnormal. The discharging is considered normal if it takes place after the voltage $V_i$ is greater than a reference voltage $V_{ref}$ (see FIG. 6) for a preset duration of time, and abnormal otherwise. The short-circuit detection circuit 9 is used to detect whether a short-circuit condition takes place based on the criterion that if the count of abnormal discharging continuously exceeds a preset number N.

The voltage divider 7 is used to obtain a voltage signal from the voltage between the discharging electrode and the working piece, and then the sample-and-hold circuit 11 is used to sample and hold the voltage signal based on a time sequence from the sequential processing circuit 10. The output of the sample-and-hold circuit 11 is then averaged by the averaging circuit 12 to be subsequently used by the CNC circuit 13 for controlling the feedrate of the discharging machine.

Figure 4:
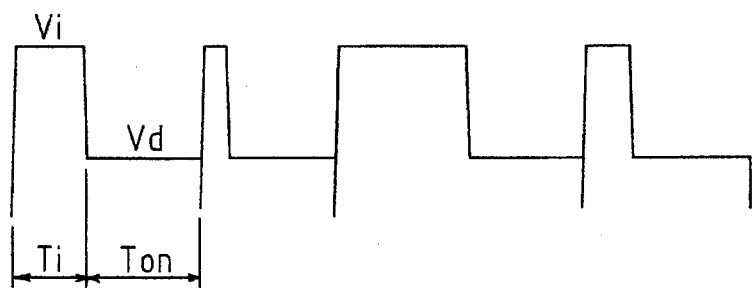
FIG. 4 is a waveform diagram, showing an output signal generated by a sample-and-hold circuit in the servo control apparatus of FIG. 3.

In normal discharging or arc discharging, the sample-and-hold circuit 11 carries out its sampling function during the out-time $T_{on}$ and the ignition delay $T_i$. This allows the magnitude of the average voltage riot to be influenced by the off-time caused by short-circuit and also allows the system to carry out the control based only on the ignition delay $T_i$ and the on-time $T_{on}$. If the ignition delay $T_i$ is long, the average voltage is close to the ignition voltage $V_1$; and if short the average voltage is close to the discharging voltage $V_d$. The magnitude of the reference voltage is preset based on this principle. It can be learned from FIG. 4 that the average voltage $V_{g2}$ during the discharging is:

$$V_{g1}=(V_i*T_i+V_d*T_{on})/(T_i+T_{on})$$

Accordingly, the CNC circuit 13 needs to control its servo voltage only between the discharging voltage and the ignition voltage. The more the servo voltage gets closer to the discharging voltage, the shorter the ignition delay becomes, which means that the discharging is rapid. However, short-circuit could take place and cause the discharging to be ineffective and the surface of the working piece to be carbonized. Therefore, in case of a short-circuit, the current supplied to the discharging electrode is interrupted and an off-time period is imposed. During the off-time period, if the average voltage is not changed, it will maintain at high magnitude, which could cause damage to the discharging electrode. In order to allow the servo control apparatus to have high sensitivity to short-circuit, in the event of a short-circuit detected by short-circuit detection circuit 9, the sample-and-hold circuit, 11 samples the off-time during the short-circuit and let the averaging circuit 12 take the off-time into account for the average voltage, thus causing the average voltage to lower rapidly, allowing the servo control apparatus to response quickly to retreat the discharging electrode away from the working piece.

Figure 5:
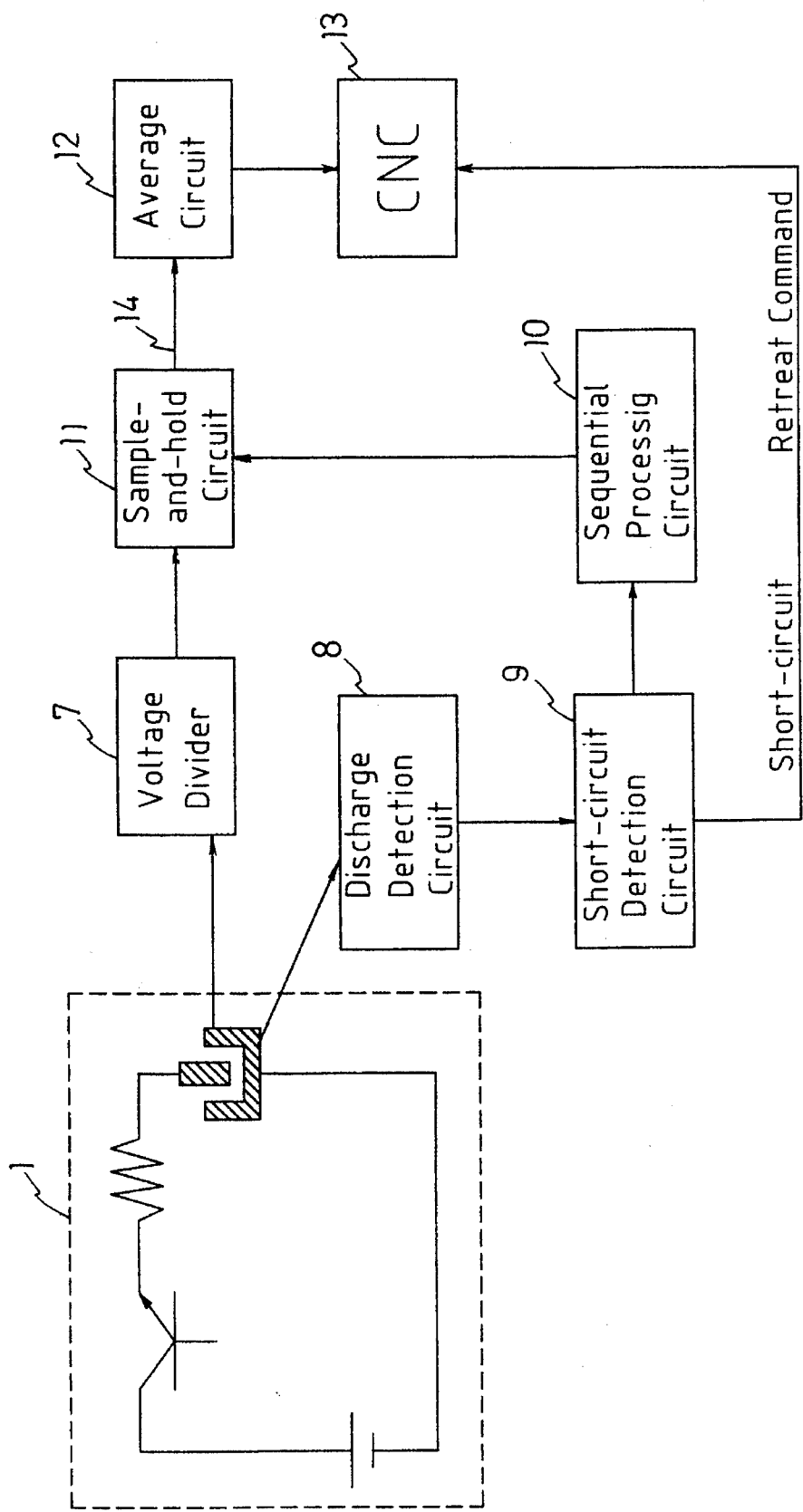
FIG. 5 is a schematic block diagram, showing a servo control apparatus according to the second preferred embodiment of the present invention.

FIG. 5 shows another preferred embodiment of a servo control apparatus according to the present invention capable of retreating the discharging electrode away from the working piece when short-circuit takes place. In the servo control apparatus of FIG. 5, when the short-circuit detection circuit 9 detects that a short-circuit takes place, it sends out a retreating signal directly to the CNC circuit 13 so that the CNC circuit 13 can respond immediately to retreat the discharging electrode away from the working piece.

Figure 6:
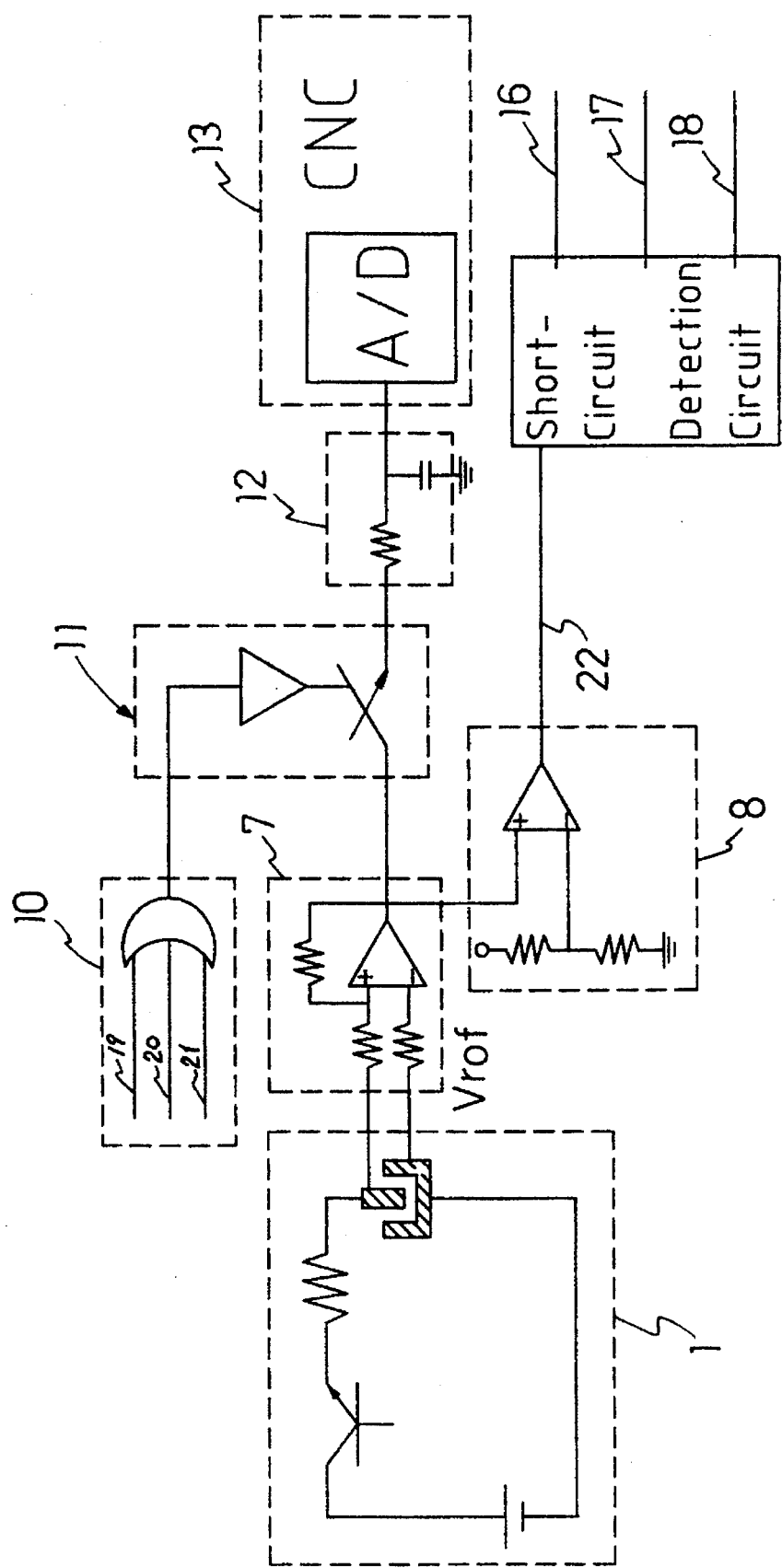
FIG. 6 is a block circuit diagram, showing the circuit structure of the servo control apparatus according to the present invention.

FIG. 6 shows a more detailed circuit diagram of the servo control apparatus of FIG. 3. The discharge detection circuit 8 outputs a signal 22 to the short-circuit detection circuit 9 which is a logic circuit that detects whether the discharging machine is in normal condition (line 16), in arc condition (line 17), or in short-circuit condition (line 18). In response, the sequential processing circuit 10 provides an on-time period $T_{on}$ of discharge sequence 21 to the sample-and-hold circuit 11 when it receives signal from line 16 or line 17 indicating normal or arc condition, and provides an off-time period $T_{off}$ of short sequence 19 when it receives signal from line 18 indicating short-circuit condition, in accordance with a delay period $T_i$ of ignition delay sequence 20. The sample-and-hold circuit 11 then uses $T_{on}$ or $T_{off}$ along with $T_i$ for the time sequential control of the voltage divider 7 to sample and hold voltage signal from the discharging machine 1. The output of the sample-and-hold circuit 11 is averaged by the averaging circuit 12 and then sent to the A/D converter 15 in the CNC circuit 13 to be converted to digital signal for numerical control of the discharging machine.

In summary, the servo control method and apparatus according to the present invention, with the aforementioned functionality, has the several advantages over the prior art. First, response to the abnormal short-circuit condition in the discharging process is quick such that carbonization of the working piece can be avoided. Second, the effect of a change in the off-time period to the stability of the discharging process can be eliminated. Third, when abnormal condition occurs, the discharging machine can respond quickly to remove scraps of the working piece.

The present invention has been described hitherto with exemplary preferred embodiments. However, it is to be understood that the scope of the present invention need not be limited to the disclosed preferred embodiments. On the contrary, it is intended to cover various modifications and similar arrangements within the scope defined in the following appended claims. The scope of the claims should be accorded the broadest interpretation so as to encompass all such modifications and similar arrangements.

What is claimed is:

1. A servo control method for use on an electrical discharging machine having a discharging electrode for discharging electric arc on a working piece, said method comprising the following steps of:

(1) detecting whether discharging condition is normal or arc, a short-circuit condition being judged when the count of arc discharging continuously exceeds a preset number of N;

(2) detecting whether discharging process is in on-time period for a normal and an arc discharging or in off-time period for a short-circuit discharging;

(3) if in on-time period, obtaining the value of average voltage in accordance with the following equation:

$$V_{g1}=(V_i*T_i+V_d*T_on)/(T_i+T_{on})$$

wherein $V_{g1}$ represents average voltage, $V_i$ represents ignition voltage, $V_d$ represents discharging voltage, $T_i$ represents ignition delay, and $T_{on}$ represents length of the duration the discharging is on;

(4) if not in off-time period, obtaining the value of average voltage $V_{g1}$ by using sample-and-hold method;

(5) using numeral control (CNC) method based on the obtained value of average voltage to control the discharging machine feedrate;

(6) if short-circuit condition is being judged, interrupting the discharging process for an off-time period and obtaining the value of average voltage in accordance with the following equation:

$$V_{g2}=(V_i*T_i+V_dT_{on})/(T_i+T_{on}+T_{off})$$

wherein $V_{g2}$ represents average voltage, $V_i$ represents ignition voltage, $V_d$ represents discharging voltage, $T_i$ represents ignition delay, $T_{on}$ represents length of the duration the discharging is on, and $T_{off}$ represents length of the duration the discharging is off;

and based on the obtained valve of average voltage $V_{g2}$ by using sample-and-hold method to retreat the discharging machine quickly.

2. A method as claimed in claim 1, wherein said Step (6), if the condition is short-circuit, the discharging electrode of the discharging machine is removed away from the working piece quickly by a retreating command directly to the CNC, the discharging process is interrupted for an off-time period and obtained the valve of average voltage $Vg_2$.

3. A servo control apparatus for use on a discharging machine having a discharging electrode for discharging electric arc on a working piece, said apparatus comprising:

(a) a voltage divider for obtaining a voltage signal from the discharging voltage between the discharging electrode and the working piece;

(b) a discharge detection circuit for detecting whether the discharging voltage is normal or abnormal;

(c) a short-circuit detection circuit, coupled to said discharge detection circuit, for detecting whether the discharging voltage is in short-circuit condition based on the criterion that the count of arc discharging continuously exceeds a preset number of N;

(d) a sequential processing circuit, coupled to said short-circuit detection circuit, for generating timing control binary signal based on input from said short-circuit detection circuit;

(e) a sample-and-hold circuit, coupled to said voltage divider and said sequential processing circuit, for processing the output of said voltage divider by using sample-and-hold method based on the timing control binary signal; and (f) an averaging circuit, coupled to said sample-and-hold circuit, for averaging the output of said sample-and-hold circuit; and (g) a CNC circuit, responding to the output of the averaging circuit, for controlling the action of the discharging electrode of the discharging machine.

* * * * *